W. S. ELLIOTT.
MOTOR.
APPLICATION FILED NOV. 1, 1912.

1,060,068.

Patented Apr. 29, 1913.

3 SHEETS—SHEET 1.

WITNESSES
R. A. Balderson
G. B. Bleming

INVENTOR
Wm. S. Elliott
by Bakewell, Byrnes & Parmelee
Atty's

W. S. ELLIOTT.
MOTOR.
APPLICATION FILED NOV. 1, 1912.
1,060,068.
Patented Apr. 29, 1913.
3 SHEETS—SHEET 2.
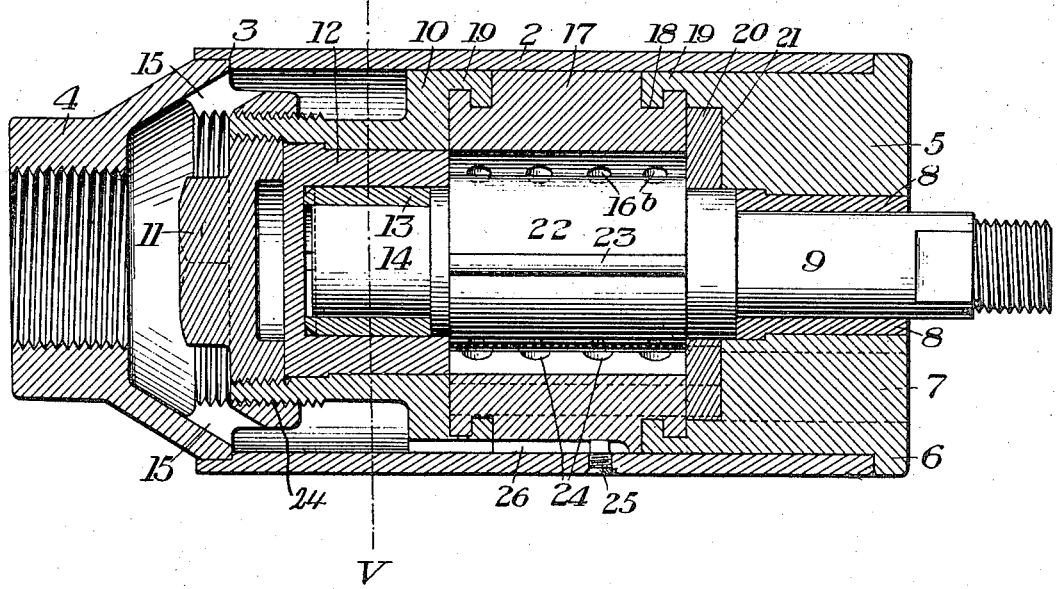
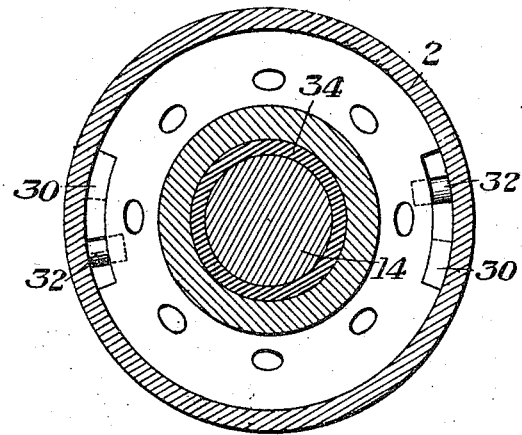
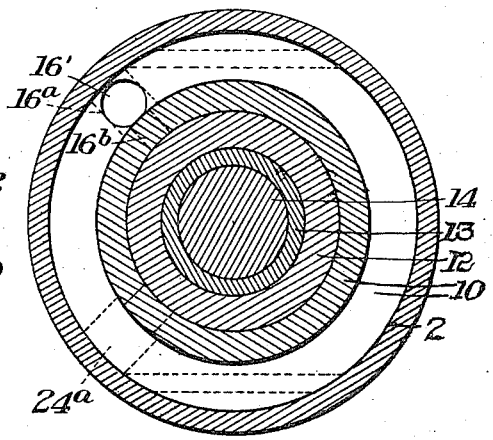
WITNESSES
R. H. Balderson
J. B. Bruning
INVENTOR
Wm S. Elliott
by Bakewell, Byrnes Parmelee
Attys.

W. S. ELLIOTT.
MOTOR.
APPLICATION FILED NOV. 1, 1912.

1,060,068.
Patented Apr. 29, 1913.
3 SHEETS—SHEET 3.

WITNESSES
R A Balderson
J. B. Bleming

INVENTOR
Wm S. Elliott

UNITED STATES PATENT OFFICE.

WILLIAM S. ELLIOTT, OF PITTSBURGH, PENNSYLVANIA.

MOTOR.

1,060,068.   Specification of Letters Patent.   Patented Apr. 29, 1913.

Original application filed March 20, 1911, Serial No. 615,600. Divided and this application filed November 1, 1912. Serial No. 729,075.

*To all whom it may concern:*

Be it known that I, WILLIAM S. ELLIOTT, a resident of Pittsburgh, in the county of Allegheny and State of Pennsylvania, have invented a new and useful Improvement in Motors, of which the following is a full, clear, and exact description, reference being had to the accompanying drawings, forming part of this specification, in which—

Figure 1:
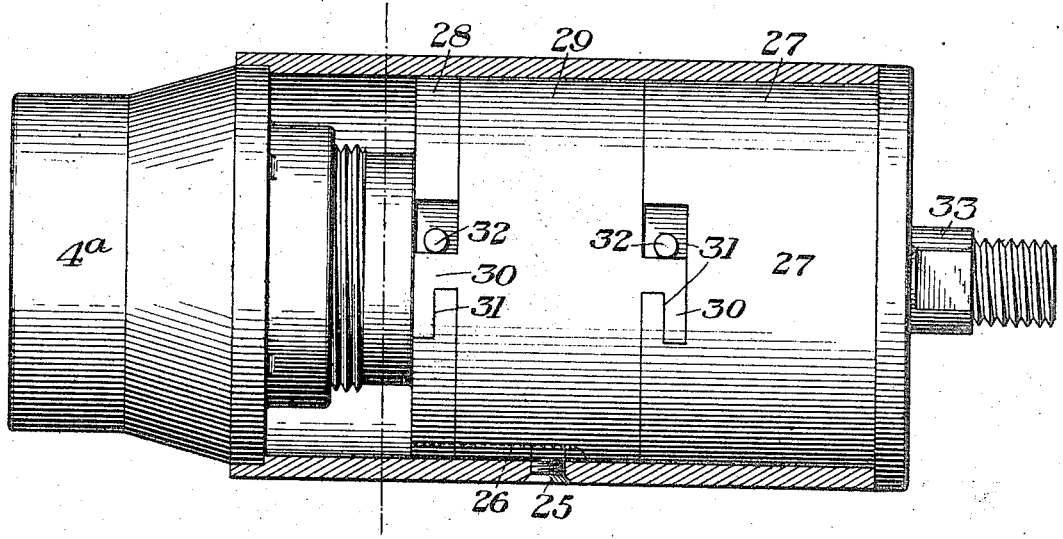
Figure 2:
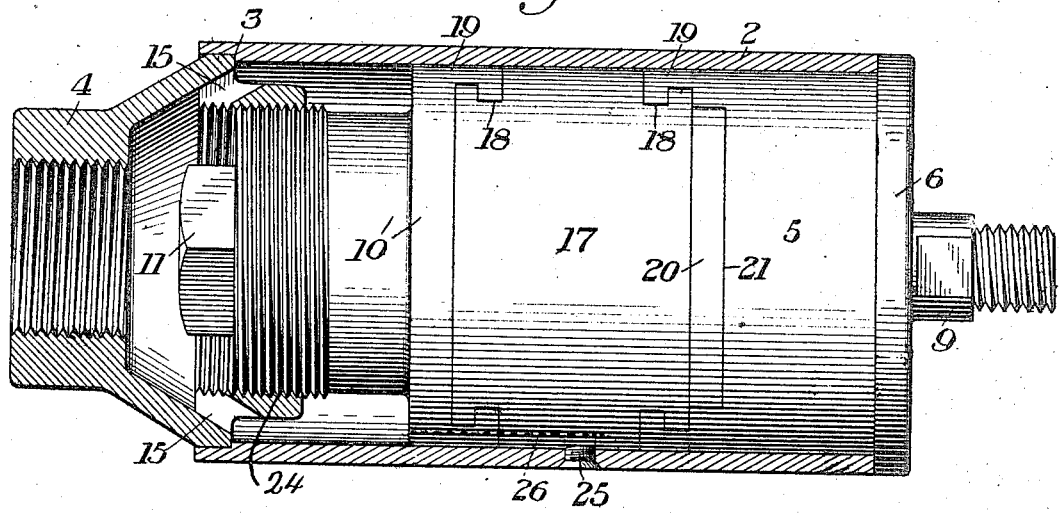
Figure 6:
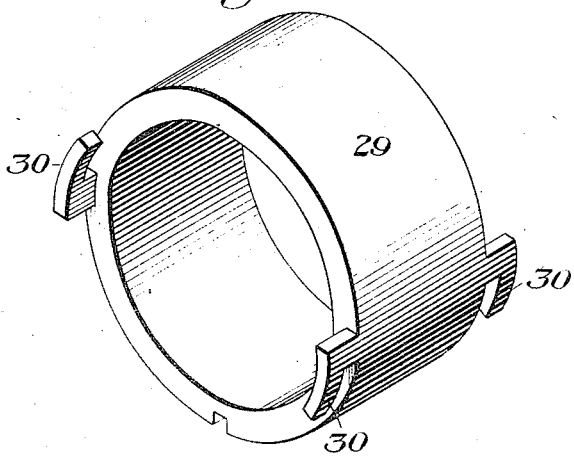
Figure 7:
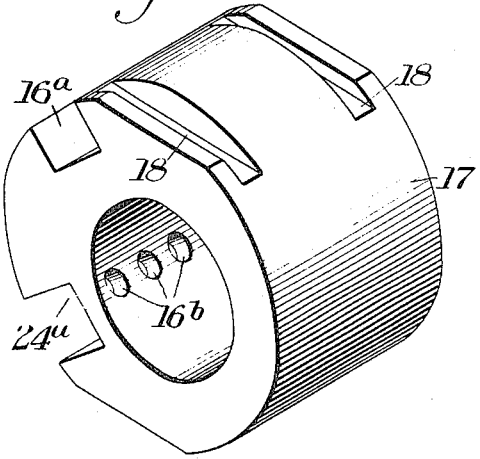
Figure 8:
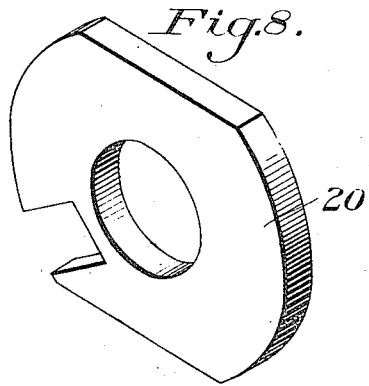

Figures 1 and 2 are views partly in longitudinal section and partly in side elevation, of two different forms of motors embodying my invention; Fig. 3 is a complete longitudinal section of the motor of Fig. 2; Fig. 4 is a section on the line IV—IV of Fig. 1; Fig. 5 is a transverse section on the line V—V of Fig. 3; and Figs. 6, 7 and 8 are detail perspective views of certain of the parts.

The present invention is a division of my copending application Serial No. 615,600, filed March 20, 1911.

My invention has relation to fluid pressure motors, and is designed to provide an efficient motor, in which the parts can be quickly and readily assembled and removed from the motor casing, and is applicable both to motors of the turbine type, in which water is used as a motive power, and also to motors of the radially reciprocating type in which air or steam forms the motive power.

The nature of my invention will be best understood by reference to the accompanying drawings, in which I have shown several different embodiments thereof, and which will now be described, it being premised, however, that various changes can be made in the details of construction and arrangement of the parts without departing from the spirit and scope of my invention.

Referring first to that form of my invention shown in Figs. 2 and 3, the numeral 2 designates an outer casing and shell, which is shown as of cylindrical form, and which is open at both ends, being preferably formed with an interior rabbet at 3, to receive the flange of the coupling member 4 for the supply pipe. The motor shown in these figures is especially adapted for use with compressed air, and is of the radially reciprocating piston type. 5 designates the front bearing member of the motor, which is inserted within the front end of the casing 2, and has the flange 6 at its outer end for engagement with the end of the casing. This member 5 is formed with an exhaust port 7 for the free escape of the exhaust air; and it also carries a bushing 8, which forms the front bearing for the motor shaft 9. 10 designates the rear bearing member of the motor, which is open at its rear end and is interiorly threaded to receive the movable nut 11. Seated in this member 10 is a removable bearing seating member 12, in which is a bushing 13, which forms a bearing for the rear shaft journal 14. The space within the rear end of the casing 2 surrounding the reduced rear portion of the member 10 forms an admission chamber into which the fluid enters through ports 15 in the coupling 4, and having ports at its front end which communicate with the interior of the motor cylinder through the ports 16′, 16ª and 16ᵇ. The cylinder-forming member is shown at 17. This member is interposed between the front and rear bearing members 5 and 10, and forms a tie connection between said members, with which it is removably interlocked. This cylinder-forming member is shown in detail in Fig. 7. It is provided at its ends with the hook-forming recesses 18, which interlock with hook portions 19 carried by the respective members 5 and 10. The cylinder-forming member is open at both ends; but when seated is closed at its rear end by the member 12, and at its front end by a wear plate 20, which is seated in a recess 21 in the inner face of the member 5. 22 designates the piston-forming portion of the shaft; and 23 the reciprocating piston blade. 24 designate cross-ports, which communicate with an exhaust port 24ª in the cylinder member, the port 24ª, in turn, communicating with the port 7 in the front bearing member.

In assembling the parts, the cylinder member is interlocked with the bearing members, and the shaft and piston are inserted from the rear, after which the members 11 and 13 are seated and secured. These parts are then all inserted into the casing 2 from the front end thereof, and are secured by means of the coupling member 4, which has a screw-threaded engagement at 24 with the rear portion of the member 10. By unscrewing the coupling 4, the motor-forming parts can be all moved from the casing through the front end thereof and can then be disassembled in the reverse order to that just described. The bearing and cylinder-forming members may be prevented from rotating within the casing 2 by any suitable means, such as the dowel pin 25, which engages a recess 26 in the cylinder member 17.

The form of motor shown in Figs. 1, 4 and 6 is a motor of the turbine type. It is, so far as material to my present invention, generally similar in construction to the form first described, but differs therefrom in certain details. In this figure, the numeral 27 designates the front bearing member, and 28 the rear bearing member. 29 is the cylinder-forming member, shown in perspective in Fig. 6, and having projecting hook portions 30, which are adapted to engage L-shaped recesses 31 in the front and rear bearing portions 27 and 28, normally held in such engagement by means of the pins 32. These pins can be loosely seated, since, when the parts are assembled within the outer casing, they are held by the latter from falling out. The turbine wheel (not shown), is secured to the shaft 33 to rotate within the cylinder member 29. In assembling this form of motor, the turbine wheel is placed within the cylindrical member 29, and the latter is inserted between the members 27 and 28, and is held in position by the pins 32. The shaft is then inserted through the wheel from the rear; and these parts are then inserted within a casing from the front end, and are secured by the coupling member 4ᵃ corresponding to the coupling member 4 first described. The rear shaft bearing is shown in Fig. 4 as consisting of a bushing 34 carried by the member 28. The front shaft bearing may consist of a bushing of the same character and arrangement as the bushing 8 shown in Figs. 3 and 5.

The advantages of my invention result from the manner in which the parts are constructed and arranged, so that they can be readily assembled and disassembled, the cylinder, in its assembled position, constituting a tie connection between the end bearing members, the whole being protected by the outer casing 2.

The combination of front and rear bearing members, cylinder, and tie connection herein described is more broadly claimed in my said application Serial No. 615,600, the present case having more particular relation to a construction in which the cylinder member forms the tie.

I claim:—

1. In a rotary motor, an intermediate open-end cylinder, bearing members removably secured to the opposite end portions of said intermediate cylinder and forming heads therefor, the cylinder acting as an intermediate tie between the head and bearing members, and said cylinder having casing means inclosing it for at least a major portion of its length; substantially as described.

2. In a rotary motor, an intermediate open-end cylinder member, bearing members removably secured to opposite end portions of said cylinder member and forming heads therefor, the cylinder acting as an intermediate tie between said bearing members, and said cylinder having casing means inclosing it for at least a major portion of its length, said casing means projecting endwise beyond the ends of the cylinder member and coacting with the bearing members; substantially as described.

3. In a rotary motor, an intermediate open-end cylinder, bearing members removably secured to the opposite end portions of said intermediate cylinder and forming heads therefor, the cylinder acting as an intermediate tie between the bearing members, and the cylinder having casing means inclosing it for at least a major portion of its length, said head and bearing members each having an elongated bush bearing for the motor shaft; substantially as described.

4. In a rotary motor, an intermediate open-end cylinder, bearing members removably secured to the opposite end portions of said intermediate cylinder and forming heads therefor, the cylinder acting as an intermediate tie between said head and bearing members, said cylinder having casing means inclosing it at least for a major portion of its length, and a wear plate between one end of said intermediate cylinder and the inner end of the adjacent bearing member; substantially as described.

5. In a rotary motor, an intermediate open-end cylinder, bearing members removably secured to the opposite end portions of said intermediate cylinder and forming heads therefor, the cylinder acting as an intermediate tie between said bearing members, said cylinder having casing means inclosing it for at least a major portion of its length, and a ported wear plate interposed between the front end of the intermediate cylinder and the inner end portion of the front bearing member; substantially as described.

6. In a rotary motor, an intermediate open-end cylinder, bearing members removably secured to opposite end portions of said intermediate cylinder and forming heads therefor, the cylinder acting as an intermediate tie between said bearing members, said cylinder having casing means inclosing it for at least a major portion of its length, and a motor shaft journaled in said bearing members and projecting from the motor through one of said members, the other member having means for attaching a supply hose thereto; substantially as described.

7. A rotary motor having front and rear bearing members provided with shaft bearings and separated from each other longitudinally of the motor, and a cylinder-forming member intermediate of said members and having hook portions which interlock therewith, the cylinder-forming member acting as a tie between the bearing members; substantially as described.

8. A rotary motor having front and rear bearing members provided with shaft bearings and separated from each other longitudinally of the motor, and a cylinder-forming member intermediate of said members and having hook portions which interlock therewith, the cylinder-forming member acting as a tie between the bearing members, together with a casing inclosing all of said members; substantially as described.

9. A rotary motor, comprising separated bearing and head-forming members, a cylinder member having a portion of maximum diameter seating between the adjacent ends of the said members and having its end portions in securing engagement with said end members to form a tie connection therefor; substantially as described.

10. A rotary motor having end members containing bearings, and a cylinder between the end members, portions of the end members having overlapping engagement with the cylinder; substantially as described.

11. A rotary motor having end members containing bearings, and a cylinder separating the end members, the outer wall of the cylinder being provided with engaging means to engage overlapping portions of the end members; substantially as described.

12. A rotary motor having front and rear bearing members, a cylinder interposed between the said members, the end members having extensions beyond the cylinder, and means for attaching said extensions to the cylinder; substantially as described.

13. A rotary motor having end members, at least one of the end members having a recess containing a wear plate, a cylinder member interposed between the end members and bearing against the wear plate, the end members having extensions beyond the end portions of the cylinder, with means for attaching said extensions to the cylinder; substantially as described.

In testimony whereof, I have hereunto set my hand.

WILLIAM S. ELLIOTT.

Witnesses:
 M. K. RILEY,
 JAS. E. WATSON.